Figure 1:
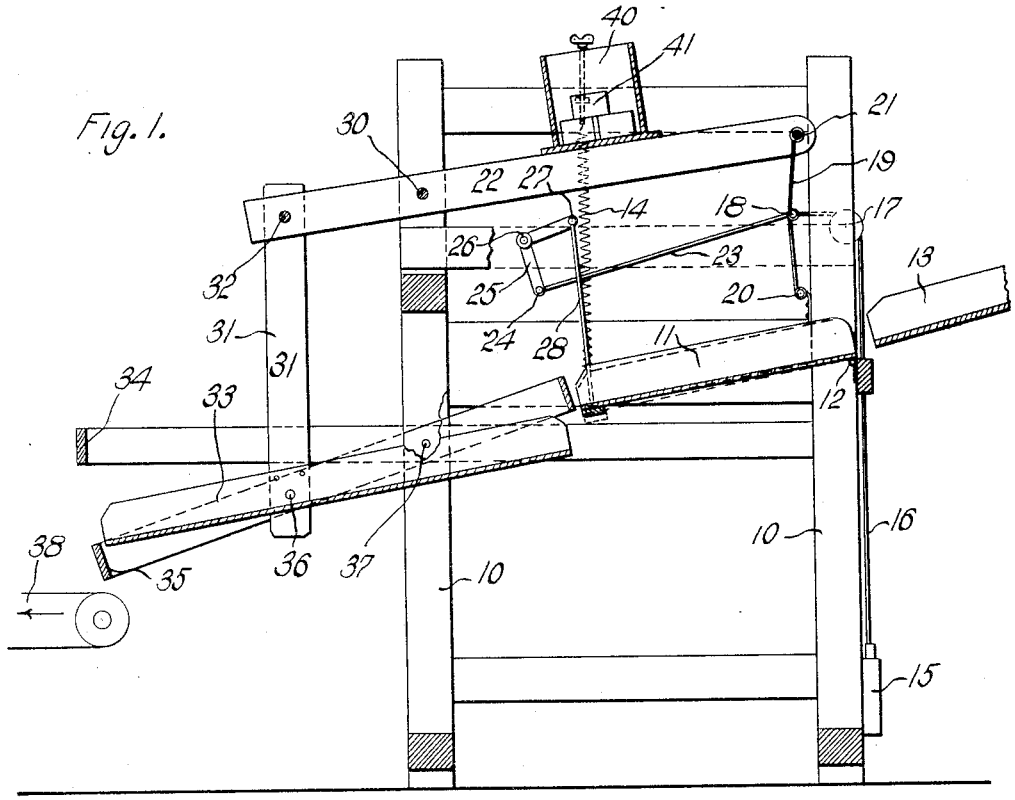

W. L. ROSS.
WEIGHING MACHINE.
APPLICATION FILED MAY 1, 1915.

1,164,873.

Patented Dec. 21, 1915.
2 SHEETS—SHEET 1.

Witness
Elwood H. Barkelew

Inventor
William L. Ross
by James T. Barkelew
his Attorney.

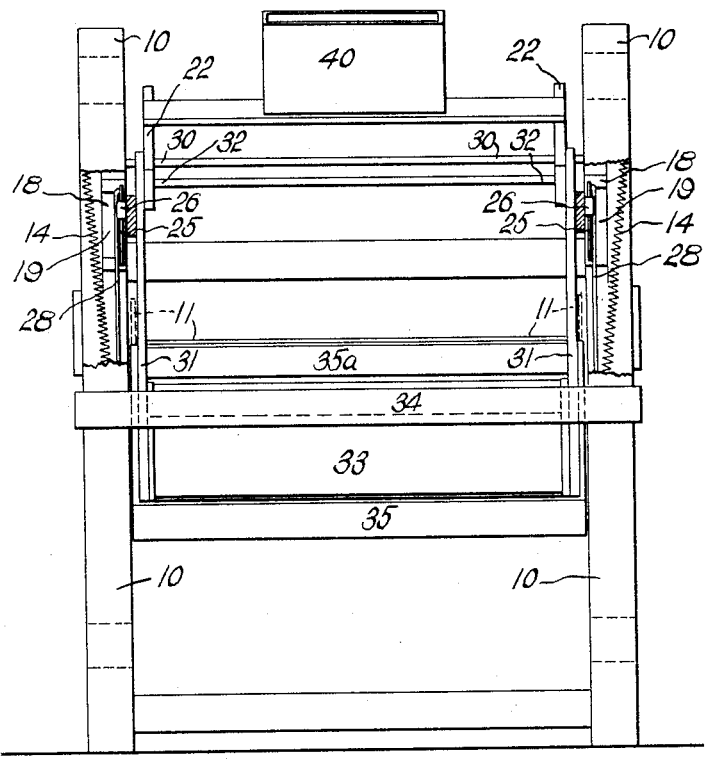

UNITED STATES PATENT OFFICE.

WILLIAM L. ROSS, OF PORTERVILLE, CALIFORNIA, ASSIGNOR OF ONE-THIRD TO JOHN A. MILLIGAN, OF PORTERVILLE, CALIFORNIA.

WEIGHING-MACHINE.

1,164,873.  Specification of Letters Patent.  Patented Dec. 21, 1915.

Application filed May 1, 1915. Serial No. 25,142.

*To all whom it may concern:*

Be it known that I, WILLIAM L. ROSS, a citizen of the United States, residing at Porterville, in the county of Tulare, State of California, have invented new and useful Improvements in Weighing-Machines, of which the following is a specification.

This invention relates generally to weighing machines, particularly to weighing machines adapted to weigh out separate parcels in lots of such material as fruit; and it is, among others, a primary object of this invention to provide a simple, reliable, and effective device which will receive a continuous flow of, say, fruit, and will deliver continuously succeeding lots of said fruit, each lot being of a certain pre-determined weight; and it is an object to provide a device in which the lot weight may be varied greatly by proper adjustment.

The particulars of this invention in preferred form are fully set forth in the following specification.

It will be noted that the invention includes primarily the use of two baskets, or the like, one of which I term a retaining basket and the other a weighing basket. It is the office of the weighing basket to hold and to deliver the weighed lots of fruit; while it is the office of the retaining basket to deliver the fruit to the weighing basket and to retain the fruit momentarily during the period of discharge of the weighing basket. It will be noted that the momentary detention of the fruit by the retaining basket is the primary means by which the separation of the succeeding weighed lots of fruit is accomplished.

The operation of my machine involves primarily the separation of succeeding lots of material by momentary stoppages in the flow of said material.

Each of the baskets is vertically movable upon a suitable stationary frame. I prefer to pivot the retaining basket, so that it moves upon a horizontal hinge, and I prefer to make the weighing basket move parallel to itself in a vertical direction. The arrangement of parts is such that, when the fruit begins to flow into the retaining basket, the retaining basket is in its normal uppermost position, being held up in such position by suitable means, such as an adjustable spring. When a certain amount of fruit has flowed into the retaining basket, it sinks; and this sinking action is the cause of certain action, as hereinafter explained, by which the weighing basket is moved upwardly to its fruit receiving position. Fruit then flows from and through the retaining basket to the weighing basket until a sufficient amount accumulates therein to cause it to sink, by overbalancing the adjustable weight which holds the weighing basket up until the weight of fruit reaches the predetermined point. The weighing basket then sinks, and its sinking action operates a double guard one part of which moves away from the discharge end of the weighing basket allowing the fruit to discharge therefrom, and the other part of which moves to a position where it intercepts the flow of fruit from the retaining basket to the weighing basket. The fruit then discharges from the weighing basket as a weighed lot. During the period of delivery from the weighing basket, fruit is again flowing into the retaining basket; and the operation is then repeated as herein described, the period necessary to place sufficient fruit in the retaining basket to cause it to move downwardly being sufficient to allow the complete discharge of the weighed lot of fruit from the weighing basket.

The following specification points out the details of a preferred form of my weighing machine, said preferred form being illustrated, for the purpose of this specification, in the accompanying drawings, in which—

Figure 2:
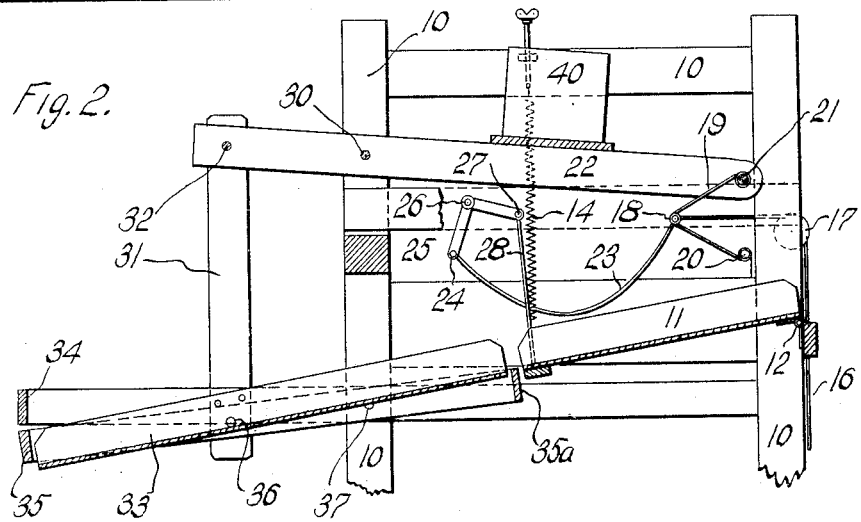

Figure 1 is a vertical longitudinal section of said weighing machine in one position, Fig. 2 is a similar view showing the mechanism in another position, and Fig. 3 is a front elevation of the machine.

In the drawings of the machine the numeral 10 designates a suitable frame work of any desired size and design. The retaining basket 11 is pivoted at 12 to the frame work at its rear end; and a chute or conveyer 13 of any desired character may continuously deliver fruit to the retaining basket. (It will be understood that although fruit is referred to in this specification, this weighing machine may be used for weighing out lots of any similar material. By appropriate changes in the size, shape, etc., of the baskets and in the specific design of the other parts of the machine, it may be adapted to any flowing material). The retaining basket 11 moves between the two positions shown in full and dotted lines in Fig. 1, and its downward movement is opposed by the springs 14 and also, incidentally, by weights 15 hung on cords or chains 16 which pass over pulleys 17 and connect to the center points 18 of hinges 19, the lower ends of the hinges being attached at 20 to the frame work and the upper ends of the hinges being attached at 21 to the rear end of the weight frame 22. A similar cord or chain 23 extends from the center point 18 of the hinge to the lower end 24 of a bell crank lever 25 pivoted at 26 to the frame; and from the other end 27 of this bell crank lever a connecting rod 28 extends downwardly to the front end of the retaining basket 11.

It will be understood that the parts just described are in duplicate, one set on each side of the machine. The downward movement of the retaining basket 11 is opposed by the springs 14 and also by the weights 15; but it will be hereinafter pointed out that the weights 15 have primarily another function; i. e. to hold the hinges 19 in a vertical straight normal position so that the hinges in this position hold the rear end of the weight frame 22 in its uppermost position.

The weight frame 22 is pivoted at 30 at the front end of the machine, the forward end of the weight frame projecting forwardly of the frame. Vertical bars 31 are connected at 32 to the forward end of the weight frame; and the weighing basket 33 is mounted upon the lower ends of these bars as indicated in Figs. 1 and 2. The relative positions of the retaining and weighing baskets can be readily seen from Figs. 1 and 2. When the weighing basket is in its lowermost position, its forward end is well below the stationary guard 34; and when the weighing basket is in its uppermost position its forward end moves in proximity with the stationary guard 34 as shown in Fig. 2. The moving guard 35 is pivoted at 36 to the vertical bars 31 and is pivotally mounted at 37 on the frame 10; so that its movement is as indicated in Figs. 1 and 2. When the weighing basket is in its uppermost position, it will be noted that the forward part of the guard 35 moves up in front of the front end of the weighing basket, the movable guard 35 and stationary guard 34 forming a complete and effectual front end to the weighing basket to prevent fruit discharging therefrom; while, when the weighing basket is in its lowermost position, the front end 35 of the movable guard moves down below the front end of the weighing basket and the front end of the weighing basket moves down below the stationary guard 34, allowing the fruit to readily discharge onto any suitable conveyer 38. The movable guard has a rear end 35$^a$ which moves up and down as illustrated, being in its lowermost position when the weighing basket is up and in its uppermost position when the weighing basket is down.

The weight frame 32 carries a suitable weight box 40 in which weights 41 may be placed in sufficient amount as desired; and this weight may of course be varied to vary the weight of the weighed lots of fruit delivered from the machine.

The tension on the springs 14 is adjusted to attain the proper operation of the machine; which is as follows: Assuming that the machine is in the position shown in Fig. 1, and that fruit or the like is being constantly delivered through the conveyer 13 to the retaining basket 11, it will be seen that the retaining basket will remain in the position shown in Fig. 1 until a certain amount of fruit has accumulated therein, being an amount of sufficient weight to overcome the tension of the springs 14 (and the weights 15.) When this takes place, the retaining basket 11 moves downwardly to the position shown in Fig. 2, fruit being still constantly delivered from the conveyer 13. The downward movement of the retaining basket 11 causes the hinges 19 to break and allows the weights 41 to throw the weight frame 22 downwardly to raise the weighing basket 33 to the position shown in Fig. 2. At the same time, the guard 35$^a$ moves downwardly to the position shown in Fig. 2, and the fruit then immediately flows directly through the retaining basket 11 into the weighing basket 33. Immediately the accumulation of fruit flows from the retaining basket to the weighing basket, the retaining basket is moved back to its normal upper position by the springs 14. The parts are then in the position shown in Fig. 2; and the fruit then continues to flow through the retaining basket into the weighing basket until sufficient is accumulated therein to overbalance the weights 41, when the weighing basket moves down and, by its downward movement, moves the guards 35 and 35$^a$ to the position shown in Fig. 1, allowing the weighing basket to discharge and intercept the flow of fruit from the retaining basket to the weighing basket. It will be noted that the movement of the retaining basket is independent of the movement of the weighing basket. The springs 14 govern the movement of the retaining basket and normally hold it in upper position. The downward movement of the weighing basket, as just described, throws the parts to the position shown in Fig. 1, straightening the hinges 19, which are then held in position by the weights 15. The hinges form a lock to hold the weighing basket and guard in discharge position until the lock is released (by breaking the hinges) by the succeeding downward movement of the retaining basket.

The weighed lot of fruit flows freely out of the weighing basket 33, while the retaining basket 11 is receiving the continuous flow from the conveyer 13. When a sufficient amount of fruit has accumulated again in the retaining basket, the retaining basket moves down and the operation herein described is repeated; but the period during which the retaining basket remains in its uppermost position is sufficient to allow the complete discharge of the weighed lot of fruit from the weighing basket 33. It will be seen that the primary function of the retaining basket is to momentarily retain the constant flow of fruit during the discharging operation of the weighing basket; that the downward movement of the retaining basket releases the weight frame which causes the upward movement of the weighing basket and that the downward movement of the weighing basket causes the discharge of fruit therefrom and causes interception of the flow of fruit from the retaining to the weighing basket. The action of the weighing basket, during the weighing operation, is entirely independent of the rate of flow of fruit; a faster or slower flow does not affect the accuracy of the weighing operation.

From the foregoing description a preferred and specific form of my invention is readily understood; but the invention is not necessarily limited to these particulars and specific details, including such changes as may be made therein without changing the nature of the invention as set forth in the appended claims.

Having described a preferred form of my invention, I claim:

1. A weighing machine, comprising a weighing basket and a retaining basket through which material flows into the weighing basket, means controlled by the mass of material in the weighing basket to discharge the weighing basket and to stop the flow of material between the baskets, and means controlled by the mass of material in the retaining basket to allow flow of material between the baskets and to stop the discharge of the weighing basket.

2. A weighing machine, comprising a weighing basket and a retaining basket through which material flows to the weighing basket, balance means for the weighing basket, balance means for the retaining basket, means operated by the downward movement of the weighing basket to discharge the weighing basket and intercept the flow of material from the retaining basket to the weighing basket, and means operated by the downward movement of the retaining basket to operate said last mentioned means to stop the discharge of the weighing basket and allow flow of material from the retaining to the weighing basket.

3. A weighing machine, comprising a weighing basket and a retaining basket through which material flows to the weighing basket, balance means for the weighing basket normally holding the weighing basket in an upper position, balance means for the retaining basket normally holding the retaining basket in an upper position, means operated by the downward movement of the weighing basket to discharge the same and to intercept flow of material from the retaining to the weighing basket, means for holding the weighing basket in lower position, and means operated by downward movement of the retaining basket to release said holding means.

4. A weighing machine, comprising a weighing basket and a retaining basket through which material flows into the weighing basket, means controlled by the weight of material in the weighing basket to discharge the weighing basket and to intercept flow of material between the baskets, and means controlled by the weight of material in the retaining basket to remove said interception means between the baskets and to stop discharge of the weighing basket.

5. A weighing machine, comprising a weighing basket and a retaining basket through which the material flows into the weighing basket, guards movable relatively to the baskets between the same and one end of the weighing basket, means controlled by the weight of material in the weighing basket to move the guards to one position relative to the baskets, and means controlled by the weight of material in the retaining basket to move the guards to another position.

6. A weighing machine, comprising a weighing basket and a retaining basket through which material flows into the weighing basket, individual balance means for said weighing basket, means controlled by the downward movement of the weighing basket to discharge the same and to intercept the flow of material between the baskets, and means controlled by the downward movement of the retaining basket to stop discharge of the weighing basket and to remove the interception between the baskets.

7. A weighing machine, comprising a weighing basket and a retaining basket through which material flows into the weighing basket, individual balance means for said baskets, guards movable relatively to the baskets between the same and at one end of the weighing basket, means controlled by downward movement of the weighing basket to move the guards to one position relative to the baskets, and means controlled by downward movement of the retaining basket to move the guards to another position relative to the baskets.

8. A weighing machine, comprising a frame, a vertically movable fruit retaining basket mounted thereon, means for holding said fruit retaining basket in an upper position until a predetermined amount of fruit is placed therein, a vertically movable weighing basket into which the fruit is discharged from the retaining basket, means for balancing the weighing basket and fruit therein so that when a predetermined amount of fruit passes into the weighing basket it will move downwardly, and guards on the frame adapted to be approached by the ends of the baskets when in their upper positions.

9. A weighing machine, comprising a frame, a vertically movable fruit retaining basket mounted thereon, means for holding said fruit retaining basket in an upper position until a predetermined amount of fruit is placed therein, a vertically movable weighing basket into which the fruit is discharged from the retaining basket, means for balancing the weighing basket and fruit therein so that when a predetermined amount of fruit passes into the weighing basket it will move downwardly, means controlled by the retaining basket to hold the weighing basket down while the retaining basket is up, and guards on the frame adapted to be approached by the ends of the baskets when in their upper positions.

10. A weighing machine, comprising a frame, a vertically movable fruit retaining basket thereon, yielding means for holding said retaining basket in an upper position until a predetermined amount of fruit is placed therein, a vertically movable weighing basket into which the fruit is discharged from the retaining basket, means for holding the weighing basket in an upper position until a predetermined amount of fruit is placed in said basket, means for holding the weighing basket in its lower position, and means for releasing said last mentioned holding means when the retaining basket moves downwardly.

11. In a device of the character described, vertically movable retaining and weighing baskets, a movable guard member having a pair of guards one at an end of each basket, and connective means between the weighing basket and the movable guard member to move said guard member coöperatively with said basket to alternately move its guards in front of the basket ends.

12. In a device of the character described, vertically movable retaining and weighing baskets, means whereby the downward movement of the retaining basket causes the upward movement of the weighing basket, and a movable guard member having two guards one in proximity to an end of each basket, and means to move said guard coöperatively with said weighing basket.

13. A weighing machine, comprising a frame, a retaining basket pivoted at its rear end to the frame, the front end of the basket being open for passage of fruit therefrom, means to hold the retaining basket in an upper position, a pivoted weight frame on the frame, a weighing basket hung from the weight frame, weight carrying means on the weight frame to oppose the downward movement of the weighing basket, a stationary guard in front of the weighing basket when in its upper position, and means whereby the downward movement of the retaining basket causes upward movement of the weighing basket.

14. A weighing machine, comprising a frame retaining basket pivoted at its rear end to the frame, the front end of the basket being open for passage of fruit therefrom, means to hold the retaining basket in an upper position, a pivoted weight frame on the frame, a weighing basket hung from the weight frame, weight carrying means on the weight frame to oppose the downward movement of the weighing basket, a stationary guard in front of the weighing basket when in its upper position, means for holding the weighing basket down against the action of said weight, said means including a pair of hinge members pivoted together centrally and pivoted terminally to the frame and to the weight frame at points approximately one above the other, weight means tending to move said hinge members to a straight line position, and flexible connection between the hinge members and the retaining basket such that downward movement of the retaining basket causes the hinge members to move from their straight line position.

In witness that I claim the foregoing I have hereunto subscribed my name this 24th day of April 1915.

WILLIAM L. ROSS.

Witnesses:
P. GAFERT,
JEWELL CLARK.

Copies of this patent may be obtained for five cents each, by addressing the "Commissioner of Patents, Washington, D. C."